United States Patent
Kanda et al.

(10) Patent No.: US 8,917,637 B2
(45) Date of Patent: Dec. 23, 2014

(54) APPARATUS AND METHODS FOR CONDUCTING FULL-DUPLEX WIRELESS COMMUNICATION WITH A COMMUNICATION PARTNER

(75) Inventors: Tetsuo Kanda, Kawasaki (JP); Tadashi Eguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 103 days.

(21) Appl. No.: 13/255,083

(22) PCT Filed: Feb. 5, 2010

(86) PCT No.: PCT/JP2010/052108
§ 371 (c)(1),
(2), (4) Date: Sep. 6, 2011

(87) PCT Pub. No.: WO2010/103889
PCT Pub. Date: Sep. 16, 2010

(65) Prior Publication Data
US 2011/0317595 A1 Dec. 29, 2011

(30) Foreign Application Priority Data
Mar. 12, 2009 (JP) ................. 2009-059559

(51) Int. Cl.
*H04B 7/00* (2006.01)
*H04B 7/04* (2006.01)
*H04W 16/28* (2009.01)

(52) U.S. Cl.
CPC ............ *H04B 7/0408* (2013.01); *H04W 16/28* (2013.01)
USPC ...................................... 370/277

(58) Field of Classification Search
CPC ..... H04I 5/1423; H04W 84/12; H04W 84/18; H04W 88/08; H04W 80/04
USPC ............. 370/276, 277, 281, 310, 310.2, 316, 370/328, 331, 334
See application file for complete search history.

(56) References Cited

U.S. PATENT DOCUMENTS 5,566,355 A * 10/1996 Kanai ............................ 445/25
6,819,943 B2 * 11/2004 Dalal .......................... 455/562.1
(Continued)

FOREIGN PATENT DOCUMENTS

EP  1545024 A1 * 6/2005
EP  1659813 B1    5/2006
(Continued)

OTHER PUBLICATIONS

Wireless HD Specification Version 1.0 Overview, LG Electronics Inc, Matsushita Electric Industrial Co., Ltd. (Panasonic), NEC Corporation, Samsung Electronics Co., Ltd, SiBeam, Inc., Sony Corporation and Toshiba Corporation, Oct. 2007, pp. 1-77.

(Continued)

*Primary Examiner* — Anh Ngoc Nguyen
(74) *Attorney, Agent, or Firm* — Carter, DeLuca, Farrell & Schmidt, LLP

(57) ABSTRACT

A wireless communication apparatus that conducts full-duplex wireless communication with a communication partner using a transmitting antenna and a receiving antenna is provided. The apparatus includes a transmitting unit configured to transmit a signal via the transmitting antenna using a first frequency channel, a receiving unit configured to receive a signal via the receiving antenna using a second frequency channel different from the first frequency channel, and a control unit configured to control beam angle of directionality of at least one of the transmitting antenna and the receiving antenna, so that a direction of a communication path of a signal which the transmitting unit transmits and the communication partner receives, and a direction of a communication path of a signal which the communication partner transmits and the receiving unit receives, differ from each other.

13 Claims, 5 Drawing Sheets

(56) References Cited

U.S. PATENT DOCUMENTS

| | | | |
|---|---|---|---|
| 7,194,262 B2 * | 3/2007 | Aoki et al. | 455/428 |
| 7,593,704 B2 * | 9/2009 | Pinel et al. | 455/130 |
| 2008/0125033 A1 * | 5/2008 | Lee et al. | 455/22 |

FOREIGN PATENT DOCUMENTS

| | | |
|---|---|---|
| EP | 1912454 A1 | 4/2008 |
| EP | 2003799 A1 | 12/2008 |
| FR | 2757004 A1 | 6/1998 |
| JP | 2002-534022 A | 10/2002 |
| JP | 2007/146733 A | 12/2007 |
| WO | 98/25362 A1 | 6/1998 |
| WO | 00/38452 A1 | 6/2000 |
| WO | 2005/048485 A1 | 5/2005 |
| WO | WO 2007146733 A1 * | 12/2007 |

OTHER PUBLICATIONS

Japanese Office Action issued on Jul. 23, 2013 in corresponding application No. 2009-059559.

* cited by examiner

FIG. 3

| | INDEX | BEAM ANGLE OF THE RECEIVING ANTENNA DIRECTIONALITY |
|---|---|---|
| FIRST UPLINK PATH | #1 | +60° |
| SECOND UPLINK PATH | #2 | +30° |
| THIRD UPLINK PATH | #3 | −30° |
| FOURTH UPLINK PATH | #4 | −60° |
| ........ | ........ | ........ |

| | INDEX | BEAM ANGLE OF THE TRANSMISSION ANTENNA DIRECTIONALITY |
|---|---|---|
| FIRST UPLINK PATH | #1 | −60° |
| SECOND UPLINK PATH | #2 | −30° |
| THIRD UPLINK PATH | #3 | +30° |
| FOURTH UPLINK PATH | #4 | +60° |
| ........ | ........ | ........ |

APPARATUS AND METHODS FOR CONDUCTING FULL-DUPLEX WIRELESS COMMUNICATION WITH A COMMUNICATION PARTNER

TECHNICAL FIELD

The present invention relates to a wireless communication apparatus, a controlling method thereof, and a program causing a computer to execute the controlling method.

BACKGROUND ART

Recently, HDMI (High Definition Multimedia Interface), one of the digital audio/video (hereinafter: AV) input/output interface standards for home electric appliances and AV appliances, becomes widespread. When HDMI cable is used for connecting a video source, such as a DVD player or a Setup-box, to a television, video data from the video source to the television can be transmitted at a maximum transmission rate of about 3 Gbps. Further, HDMI cable is not limited to be used for the transmission of video data from the video source to the television; HDMI cable can also be used for transmission of an appliance controlling command via which the television controls the video source.

Recently, WirelessHD has defined as a standard for using wireless technology to transmit AV contents such as video data and audio data, and the overview of the standard was published (http://www.wirelesshd.org/WirelessHD_Full_Overview_071009.pdf).

WirelessHD employs millimeter radio wave (Hereinafter: millimeter wave), which uses 60 GHz band as a frequency band. A frequency band including 60 GHz band, which is for example a frequency band of 7 GHz bandwidth from 59 GHz to 66 GHz in Japan, can be freely used without any license. Since such broad bandwidth can be used in millimeter wave, the scheme is suitable for wireless video data transmission which requires high data transmission rate.

The overview of WirelessHD also mentions that signals received via a HDMI cable from an appliance that supports HDMI are transmitted through a wireless connection.

However, the overview of WirelessHD does not mention a detailed transmission scheme regarding wireless transmission of HDMI signals using WirelessHD that are received via the HDMI cable from the appliance that supports HDMI.

Since wavelength of millimeter wave signal is short, millimeter wave signal has high straightness and thus when transmission path is blocked by an obstacle such as a human body, the communication is easily disrupted. Therefore, in case millimeter wave signal is used for wireless transmission of real time data such as AV data, above characteristics should be considered when a system architecture is designed.

One aspect of the present invention provides a transmission method that supports full-duplex wireless communication using signals with short wavelength such as millimeter wave signals.

DISCLOSURE OF INVENTION

According to a first aspect of the invention, a wireless communication apparatus that conducts full-duplex wireless communication with a communication partner using a transmitting antenna and a receiving antenna is provided. The apparatus includes transmitting means configured to transmit a signal via the transmitting antenna using a first frequency channel, receiving means configured to receive a signal via the receiving antenna using a second frequency channel different from the first frequency channel, and control means configured to control beam angle of directionality of at least one of the transmitting antenna and the receiving antenna, so that beam angle of a communication path of a signal which the transmitting means transmits and the communication partner receives, and a direction of a communication path of a signal which the communication partner transmits and the receiving means receives, differ from each other.

According to a second aspect of the invention, a control method of a communication apparatus that conducts full-duplex wireless communication with a communication partner using a transmitting antenna and a receiving antenna is provided. The method includes the steps of transmitting a signal via the transmitting antenna using a first frequency channel, and receiving a signal via the receiving antenna using a second frequency channel different from the first frequency channel, and controlling beam angle of directionality of at least one of the transmitting antenna and the receiving antenna, so that a direction of a communication path of a signal which is transmitted via the transmitting antenna and is received by the communication partner, and a direction of a communication path of a signal which is transmitted by the communication partner and is received via the receiving antenna, differ from each other.

Further features of the present invention will become apparent from the following description of exemplary embodiments (with reference to the attached drawings).

BRIEF DESCRIPTION OF DRAWINGS

The accompanying drawings, which are incorporated in and constitute a part of the specification, illustrate embodiments of the invention, and together with the description, serve to explain the principles of the invention.

FIG. 3 is a diagram exemplifying the memory area in the receiving path selection unit;

BEST MODE FOR CARRYING OUT THE INVENTION

With reference to the figures, an illustrative preferable embodiment of the present invention will now be described.

Figure 1:
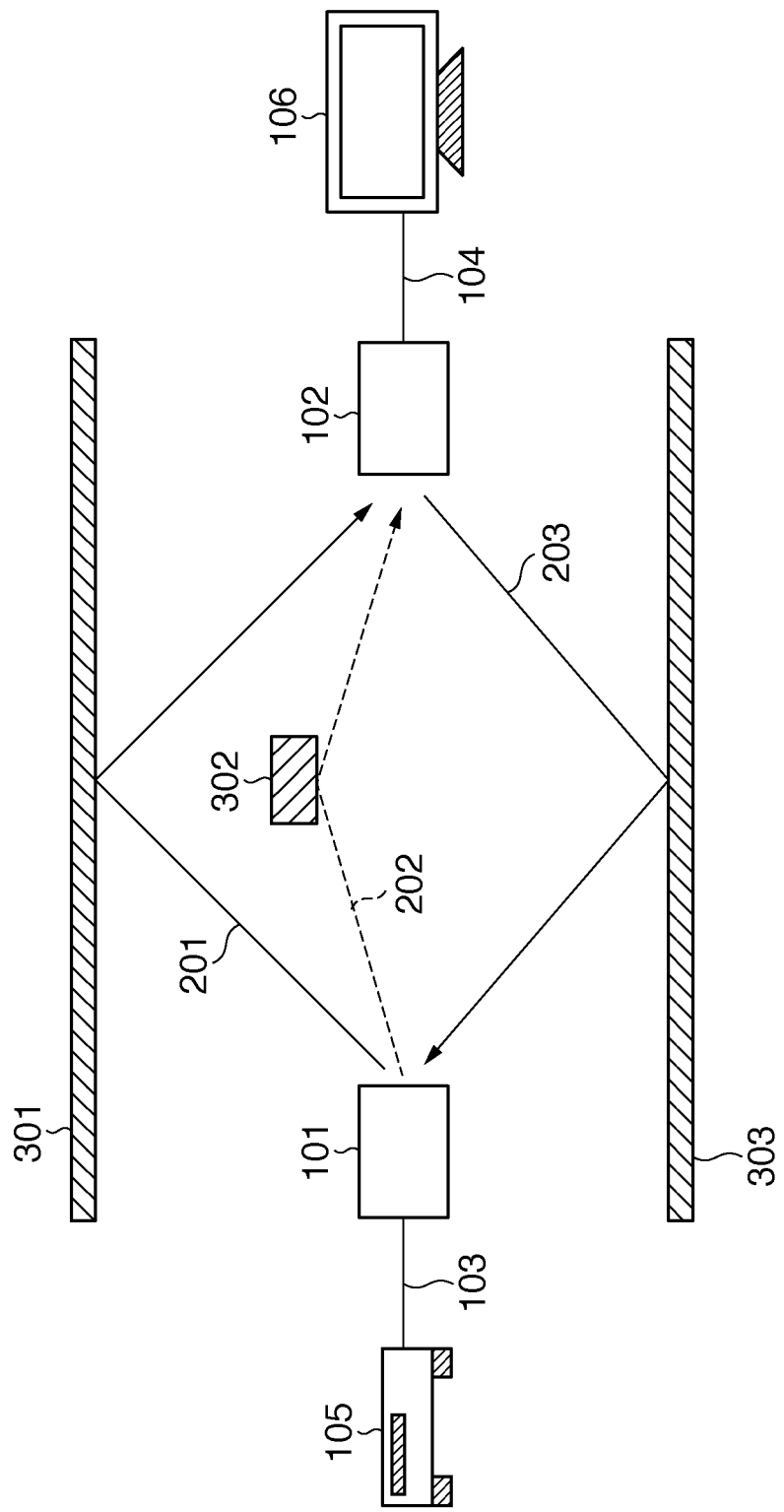
FIG. 1 is an exemplary system diagram according to an embodiment of the present invention.
Figure 2:
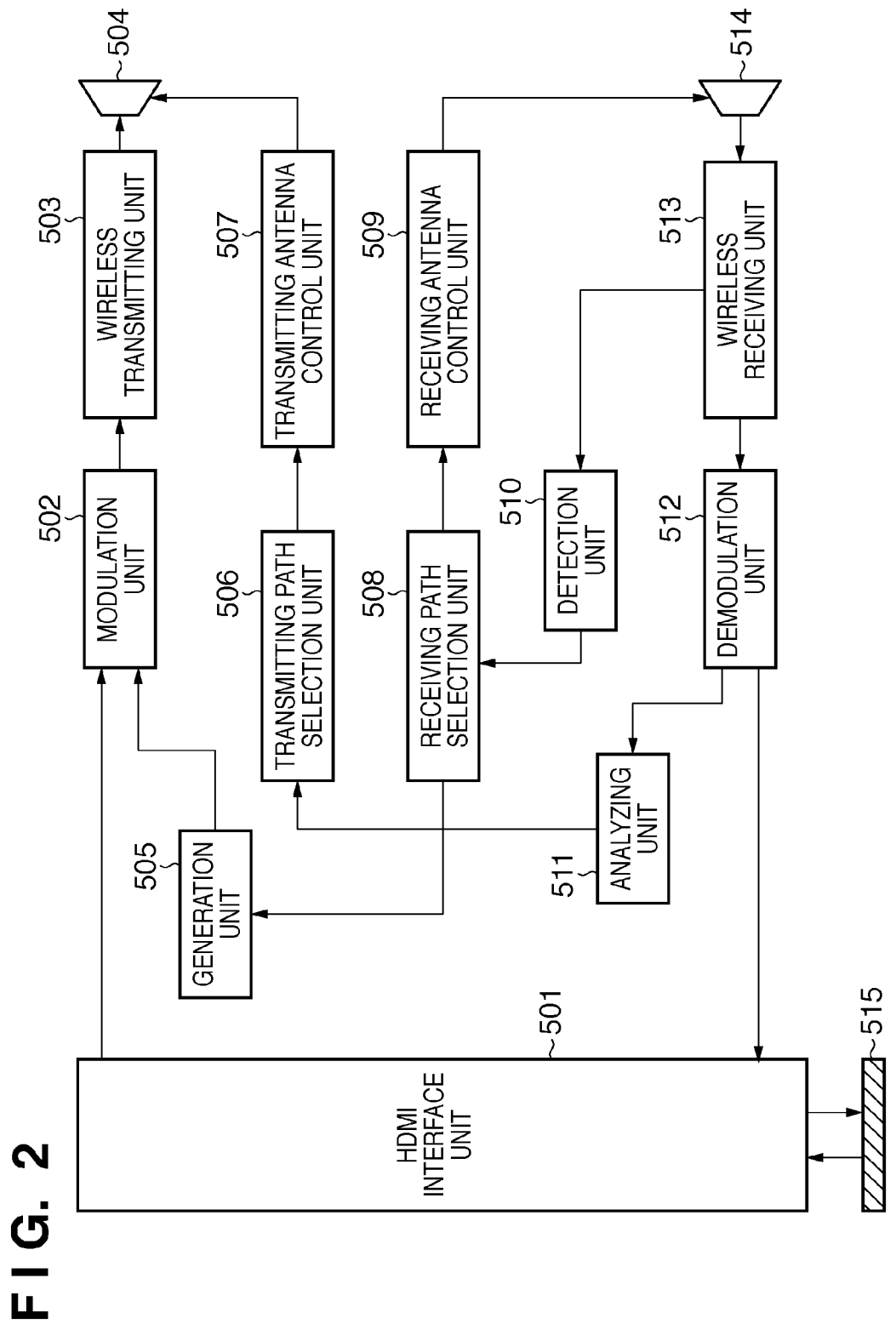
FIG. 2 is an exemplary block diagram of the wireless communication apparatus according to an embodiment of present invention.

An embodiment of a wireless communication system according to the present invention is described using FIGS. 1 and 2. FIG. 1 shows an exemplary system diagram and FIG. 2 shows an exemplary block diagram of a wireless communication apparatus.

The wireless communication system shown in FIG. 1 is a system that can conduct full-duplex communication using millimeter wave. In the system, a DVD player 105 which is a video source and a television 106 conduct wireless communication through a first wireless communication apparatus 101 and a second wireless communication apparatus 102 which are used as wireless adapters.

In this figure, the DVD player 105 and the first wireless communication apparatus 101 are connected via a first HDMI cable 103; the television 106 and the second wireless communication apparatus 102 are connected via a second HDMI cable 104. Video data is sent to the first wireless communication apparatus 101 from the DVD player 105.

Figure 6:
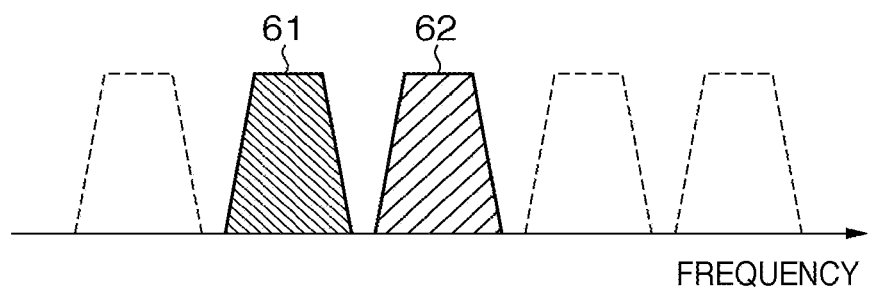
FIG. 6 is a figure showing an example of frequency channels.

The first wireless communication apparatus 101 transforms video data received via the first HDMI cable 103 into a wireless signal, and transmits the wireless signal through a first uplink path 201. In this transmission, the first wireless communication apparatus 101 selects a first frequency channel 61 from among a plurality of wireless channels allocated on the frequency axis as shown in FIG. 6, and sends the wireless signal using this first frequency channel 61. As mentioned above, the first wireless communication apparatus 101 controls the communication so that the signals received from the DVD player 105 via the HDMI cable 103 is sent using the first frequency channel 61.

In the following description, a communication path used for transmitting signals from the first wireless communication apparatus 101 to the second wireless communication apparatus 102 is referred as an uplink path; and a communication path used for transmitting signals from the second wireless communication apparatus 102 to the first wireless communication apparatus 101 is referred as a downlink path. However, these terms are merely used for simplifying the description. When the uplink path is seen from the first wireless communication apparatus 101, the uplink path can also be referred as a transmitting path; on the other hand when the uplink path is seen from the second wireless communication apparatus 102, the uplink path can also be referred as a receiving path. Similarly, when the downlink path is seen from the first wireless communication apparatus 101, the downlink path can also be referred as a receiving path; on the other hand when the downlink path is seen from the second wireless communication apparatus 102, the downlink path can also be referred as a transmitting path.

The first uplink path 201 according to the present embodiment is not a direct wave between the two wireless communication apparatuses, but a reflected wave arriving to the second wireless communication apparatus 102 after reflecting on a reflective object 301. Some examples of the reflective object 301 are internal or external wall of a building, a column, a ceiling, a floor, furniture, a fixture and the like, which reflect electromagnetic wave.

Since a wavelength of a millimeter wave signal is short (about 5 mm), it is possible to implement an antenna element to be smaller in size; therefore, it is easy to implement an array antenna comprising a plurality of antenna elements. Using an array antenna yields the following two main advantages, namely, an increased antenna gain and controllable directionality.

In general, when the wireless signal is reflected on a reflective object as mentioned above, the signal strength may reduce due to reflection loss. Therefore, when reflected waves are used for communication, the communication distance may become shorter or the communication may become impossible. However, as in present embodiment, employing an array antenna with a large gain may allow compensating the loss due to reflections; thereby enabling communication using the reflected waves. Moreover, by controlling directionality using the array antenna, a plurality of communication paths including not only the first uplink path 201 shown in FIG. 1 but also the second uplink path 202 which is a reflected wave on the reflective object 302, become available. The direct wave to the communication partner can also be used for a communication path.

The second wireless communication apparatus 102 demodulates the signal received through the first uplink path 201 using the first frequency channel 61, and transmits the demodulated video data to the television 106 via the second HDMI cable 104. Then, the television 106 plays the video data received via the second HDMI cable 104 on its screen. As above, by using the first frequency channel 61, video data is transmitted wirelessly from the DVD player 105 to the television 106.

In appliances connected via an HDMI cable, it is possible to control one appliance from another by sending a control command via the HDMI cable. As an example, when a user instructs the television using a remote controller to play or stop a video content, the corresponding control command is sent to the video source such as a DVD player via the HDMI cable. The video source device that has received the control command plays or stops the video content based on the control command.

The method of sending a control command wirelessly from the television 106 to the DVD player 105 will now be described. Upon receiving an appliance control instruction from a user using, for example, a remote controller, the television 106 sends the corresponding control command to the second wireless communication apparatus 102 via the second HDMI cable 104. The second wireless communication apparatus 102 transforms the control command received via the second HDMI cable 104 into a wireless signal, and sends the signal to the air through a first downlink path 203. Regarding this transmission, the second wireless communication apparatus 102 selects a second frequency channel 62 that is different from the first frequency channel 61 from among the plurality of frequency channels allocated on the frequency axis as shown in FIG. 6, and sends the wireless signal using the second frequency channel 62.

In the embodiment, the first downlink path 203 is a reflected wave that arrives to the first wireless communication apparatus 101 after reflected on the reflective object 303. As shown in FIG. 1, the first and second wireless communication apparatuses control directionality of the transmitting antenna and the receiving antenna respectively so that the first downlink path 203 and the first uplink path 201 differ from each other. To simplify the description of present embodiment, only one path is shown as the downlink path; however, similar to the uplink paths, there may be a plurality of downlink paths using a plurality of reflected waves.

The first wireless communication apparatus 101 demodulates the wireless signal received via the first downlink path 203 using the second frequency channel 62, and then sends the demodulated control command to the DVD player 105 via the first HDMI cable 103. Upon receiving the control command, the DVD player 105 conducts a playback or stop operation of the video content in respond to the control command. As mentioned above, similar to the wireless transmission of the video data, the wireless transmission of the control command from the television 106 to the DVD player 105 is conducted. By utilizing frequency channels different from each other, for example utilizing the first frequency channel 61 for the uplink communication and the second frequency channel 62 for the downlink communication, full-duplex wireless communication can be realized.

FIG. 2 shows an exemplary block diagram of both the first wireless communication apparatus 101 and second wireless communication apparatus 102 according to the embodiment. The block diagram of FIG. 2 is merely an example; a plurality of functions may be integrated into one block or one block may be separated into a plurality of blocks.

The first wireless communication apparatus 101 transmits signals in first carrier frequency at the uplink, and receives signals in a second carrier frequency, which is different from the first carrier frequency, at the downlink. On the other hand, the second wireless communication apparatus 102 transmits signals in the second carrier frequency, and receives signals in the first carrier frequency. Therefore, the difference between the first wireless communication apparatus 101 and the second wireless communication apparatus 102 is merely the interchange of the receiving and transmitting carriers; therefore, the block diagram in FIG. 2 can be used for both wireless communication apparatuses. By using different carrier frequencies for transmitting and receiving, the communication system realizes full-duplex communication.

With reference to FIG. 2, operations of the first wireless communication apparatus 101 will now be described. The first wireless communication apparatus 101 uses the HDMI connector 515 so as to be connected with the DVD player 105 via the HDMI cable. The HDMI interface (I/F) unit 501 transfers the video data received from the HDMI cable to the modulation unit 502, and the modulation unit 502 modulates the video data into an analog transmitting signal. It should be understood that any modulation methods such as phase modulation, amplitude modulation, OFDM modulation, and spread spectrum methods can be used in the present invention. The wireless transmission unit 503 transforms the modulated analog transmitting signal into a millimeter wave signal, and transmits the millimeter wave signal via the transmitting antenna 504 using the first carrier frequency.

Moreover, the first wireless communication apparatus 101 uses the wireless receiving unit 513 to transform a wireless signal received via the receiving antenna 514 using the second carrier frequency into an analog received signal, and transfers the analog received signal to the demodulation unit 512. The demodulation unit 512 demodulates the analog received signal and transfers the demodulated signal to the HDMI interface unit 501. Finally, the HDMI interface unit 501 uses the HDMI connector 515 to send the control command to the DVD player 105 via the HDMI cable.

Next, exemplary operations of the second wireless communication apparatus 102 will now be described. As described above, the block diagram of the second wireless communication apparatus 102 can be also represented using the FIG. 2. The second wireless communication apparatus 102 uses the HDMI connector 515 so as to be connected with the television 106 via the HDMI cable. The HDMI interface unit 501 transfers the control command received from the HDMI cable to the modulation unit 502, and then the modulation unit 502 transforms the control command to an analog transmitting signal. The wireless transmission unit 503 transforms the modulated analog transmitting signals into a millimeter wave signal, and then transmits the millimeter wave signal using the second carrier frequency via the transmitting antenna 504.

Similarly, the second wireless communication apparatus 102 uses the wireless receiving unit 513 to transform a wireless signal received from the receiving antenna 514 using the first carrier frequency into an analog received signal, and sends the analog received signal to the demodulation unit 512. The demodulation unit 512 transfers video data obtained by demodulating the analog received signal to the HDMI interface unit 501. The HDMI interface unit 501 uses the HDMI connector 515 to send the video data to the television 106 via the HDMI cable.

In case the first uplink path 201 of the FIG. 1 is blocked by an obstacle, wireless transmission from the first wireless communication apparatus 101 to the second wireless communication apparatus 102 becomes impossible. The second wireless communication apparatus 102, which is the receiving side, determines reception state using the wireless receiving unit 513. Specifically, the wireless receiving unit 513 measures the signal strength of the received signal, and then sends this signal strength information to the detection unit 510. By comparing the received signal strength information with a threshold value, the detection unit 510 detects whether the wireless transmission is impossible because the wireless communication path has been blocked.

Upon detecting the communication path blocked, the detection unit 510 sends a block detection signal to the receiving path selection unit 508. The receiving path selection unit 508 retains a memory area storing an index and a beam angle of the receiving antenna directionality for each of a plurality of uplink paths as shown in the upper part of the FIG. 3.

Upon receiving the block detection signal from the detection unit 510, the receiving path selection unit 508 stops receiving signals from first uplink path 201 which has already been blocked, and switches to the second uplink path 202. Then the receiving path selection unit 508 communicates the beam angle of the receiving antenna directionality corresponding to the second uplink path 202 to the receiving antenna control unit 509. The receiving antenna control unit 509 controls the beam angle of directionality of the receiving antenna 514 so as to correspond with the uplink path 202.

According to the above processes, the second wireless communication apparatus 102 which is unable to receive through the first uplink path 201, switches the beam angle of directionality to the second uplink path 202 to receive the uplink communication.

Moreover, the receiving path selection unit 508 of the second wireless communication unit 102 communicates the index corresponding to the newly selected second uplink path 202 to the generation unit 505. The generation unit 505 generates a command for antenna switching (or updating) which includes the index, and then sends the command to the modulation unit 502. The modulation unit 502 generates an analog transmitting signal which is modulated according to this command, and sends the analog transmitting signal to the wireless transmitting unit 503. The wireless transmitting unit 503 transforms the analog transmitting signal to a millimeter wave wireless signal, and transmits the millimeter wave wireless signal via the transmitting antenna 504 to the first downlink path 203.

In this case, since the first uplink path 201 has been blocked with the obstacle, the uplink communication from the first wireless communication apparatus 101 to the second wireless communication apparatus 102 is impossible. On the other hand, the first downlink path 203 is different from the first uplink path 201; therefore, the downlink path 203 is not blocked with the obstacle. Therefore, the command transmitted by the second wireless communication apparatus 102 using the millimeter wave signal in order to instruct antenna switching, can arrive to the first wireless communication apparatus 101 through the first downlink path 203.

The first wireless communication apparatus 101 receives the millimeter wave wireless signal from the first downlink path 203, using the receiving antenna 514. The above-mentioned command is carried by the millimeter wave wireless signal. The first wireless communication apparatus 101 uses the wireless receiving unit 513 to transform the received millimeter wave wireless signal into an analog received signal and sends the analog received signal to the demodulation unit 512.

The demodulation unit 512 demodulates the analog received signal to obtain the command for antenna switching, and then transfers the command to the analyzing unit 511. The analyzing unit 511 obtains the index corresponding to the second uplink path 202, which is included in the command for antenna switching, and transfers the index to the transmitting path selection unit 506.

The transmitting path selection unit 506 retains a memory area storing an index and a beam angle of the transmitting antenna directionality for each of a plurality of uplink paths as shown in the lower part of the FIG. 3. The transmitting path selection unit 506, by referring to the index received from the analyzing unit 511, transfers the beam angle of the transmitting antenna directionality corresponding to the second uplink path 202 to the transmitting antenna control unit 507. Then, the transmitting antenna control unit 507 controls the beam angle of directionality of the transmitting antenna 504 so as to correspond to the second uplink path 202.

According to above processes, the first wireless communication apparatus 101, for conducting the uplink transmission, switches the beam angle of directionality to the second uplink path 202. As described above, the receiving antenna directionality of the second wireless communication device has already pointed the second uplink path 202. Therefore, the two wireless communication apparatuses can keep the full-duplex communication using the second uplink path 202 instead of the first uplink path 201 which has been blocked with an obstacle.

Figure 4:
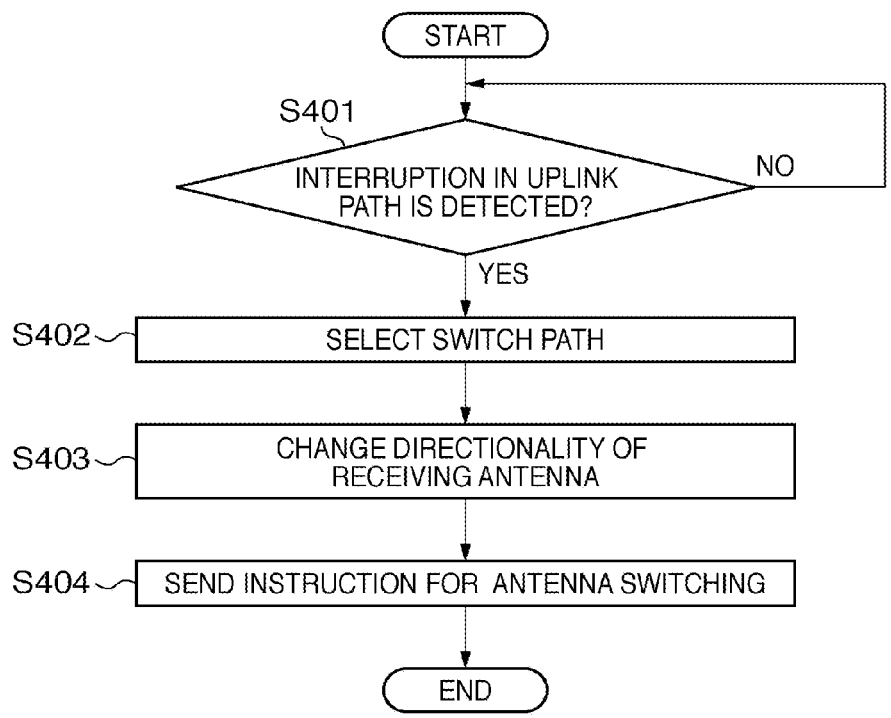
FIG. 4 is a flowchart showing exemplary operations of the second wireless communication apparatus.
Figure 5:
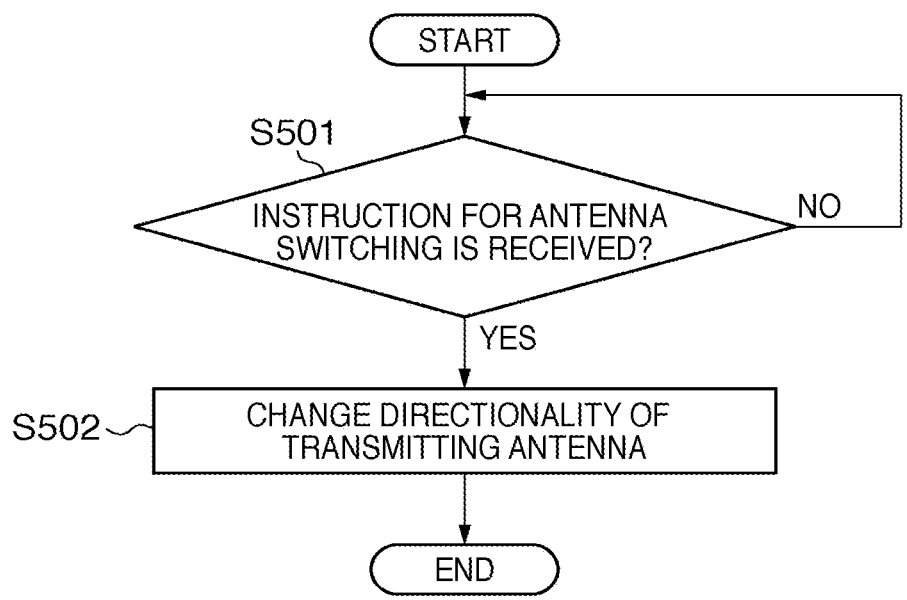
FIG. 5 is a flowchart showing exemplary operations of the first wireless communication apparatus.

Next, simplified operations of the first wireless communication apparatus 101 and the second wireless communication apparatus 102 when the uplink path 202 is blocked with an obstacle are described using the FIGS. 4 and 5. FIG. 4 is a flowchart showing the process flow of the second wireless communication apparatus 102, and FIG. 5 is a flowchart showing the process flow of the first wireless communication apparatus 101.

When the second wireless communication apparatus 102 detects that the first uplink path 201 has been blocked ("YES" in S401), the second wireless communication apparatus 102 selects an uplink path used as a switching destination (S402). Various algorithms may be applied as the selection method of the uplink path used as the switching destination. As an example, the second wireless communication apparatus 102, by referring to a stored table as shown in the upper part of FIG. 3, may select the uplink path indicated by the next index of the uplink path index that has been used up to now. Alternatively, the second wireless communication apparatus 102 may use the last (lowest) index of the table or may use an index randomly selected.

Moreover, the second wireless communication apparatus 102 may select an uplink path having the same direction as the downlink path has. Since the downlink path has not been blocked, by changing the uplink path beam angle of directionality to the downlink path beam angle, the probability of uplink path to be blocked after the change becomes lower. However, when the uplink path and the downlink path are set to the same direction, the paths may be blocked at the same time by another obstacle, in that case, the wireless communication apparatus become unable to notify the changing of the beam angle of directionality. Therefore, to prevent such situation, when the uplink path and the downlink path are changed to have the same direction, the wireless communication apparatus may change the direction of one wireless communication apparatus to another direction after a predetermined time elapses.

Upon selecting an uplink path used as a switching destination, the second wireless communication apparatus 102 changes the beam angle of directionality of the receiving antenna 514 to the beam angle corresponding to the selected uplink path (S403). Moreover, the second wireless communication apparatus 102 sends a command for antenna switching which includes the index of the selected uplink path, to the first wireless communication apparatus 101 through the first downlink path 203.

When the first wireless communication apparatus 101 receives the command for antenna switching ("YES" in S501), the first wireless communication apparatus 101 changes the beam angle of directionality of the transmitting antenna 504 to a beam angle corresponding to the new uplink path by referring to the index included in the command (S502).

As above, the case where the uplink path has been blocked is described in detail; obviously, it is similarly applied to the case where the downlink path is blocked. In this case, the first wireless communication apparatus 101 conducts the processes of FIG. 4 (here, the first wireless communication apparatus detects whether the downlink path is blocked in S401), and the second wireless communication apparatus 102 conducts the processes of FIG. 5. When the first and second wireless communication apparatuses 101, 102 conduct the processes of FIGS. 4 and 5, even in case one of the uplink path and the downlink path gets blocked, the first and second wireless communication apparatuses 101, 102 can notify the command for path switching using the other path which is not blocked.

As above, in the embodiment according to the present invention, by using the millimeter wave characteristics that allow antenna element to be implemented to be small in size, array antennas where both transmitting and receiving sides having a plurality of antenna elements, with controllable directionality, are used. Therefore, in both transmitting and receiving, a plurality of communication channels which include the reflected wave can be used. Moreover, the system is constructed for using different frequency channels for transmitting and receiving, as well as controlling the beam angles of directionality of the transmitting antennas and the receiving antennas. Therefore, even in case the transmitting path or receiving path has been blocked by an obstacle, by sending a direction switching instructions using the other path, restarting the communication quickly using the switched channel is possible. As a result, full-duplex wireless communication with better usability and reliability becomes possible; further, it may be used as a adapter that conduct signal transformation between wired interface such as an HDMI cable that allows bidirectional communication and wireless interface.

In the present embodiment, both the first and second wireless communication apparatus 101, 102 store a plurality indexes of the uplink paths and the beam angle of directionality (FIG. 3), and in case the beam angle of directionality is being changed, a command for antenna switching which includes the corresponding index is transmitted. However, if it is possible to make changes to the beam angle of directionality of the antenna of the communication partner, it is not necessary to include the index in the command. As an example, a wireless communication apparatus may send a command that includes information indicating the switched beam angle of directionality of the transmitting antenna. Moreover, when the wireless communication apparatus may notify that the communication path is blocked, then the wireless communication apparatus that received the notification may switch the beam angle of directionality of the transmitting antenna automatically.

Moreover, in the present embodiment, array antennas which can control the beam angle of directionality are used in both the transmitting antenna and the receiving antenna; however, it is possible to have only one of the transmission antenna or the receiving antenna as an array antenna which can switch the beam angle of directionality. As an example, both the first and the second wireless communication apparatus 101, 102 may use array antennas which can control the beam angle of directionality as transmitting antennas, and may use omni-directional antennas as receiving antennas. Even in this case, the first and the second wireless communication apparatuses 101, 102 can control the transmission antennas respectively so that the uplink path direction and the downlink path direction have different directions. Therefore, operations in FIGS. 4 and 5 are performed, similar to the case where the array antennas are used for both the transmitting antenna and the receiving antenna. However, in case an omni-directional antenna is used, step S403 of FIG. 4 is omitted.

Moreover, in the present embodiment, it is determined whether the communication path is blocked by measuring the received signal strength; here, when the wireless communication apparatus determines that communication is not completely blocked but the communication is interrupted by an obstacle, the wireless communication apparatus may switch the communication path. Moreover, the wireless communication apparatus may use measurements such as S/N, bit error rate, etc. for criteria of the determination, instead of the received signal strength.

Moreover, in the present embodiment, an HDMI cable is used as cable that connects to an external device such as the DVD player 105 and the television 106. However, bidirectional communication supported cable interfaces such as USB, RS232C, and IEEE1394 can be used in a similar manner.

Moreover, in the present embodiment, a wireless communication apparatus connected to an external apparatus through wired interface is used as an example. However, the wireless communication apparatus according to the present embodiment may exist as a stand-alone unit or a part embedded within another equipment; the present invention also includes these cases.

Moreover, in the present embodiment, the transmitting antenna and the receiving antenna are separately implemented. However, as an example, even in case of an integrated antenna which has both transmitting function and receiving function, the present invention can be applied in a similar manner.

Moreover, in the present embodiment, video data and control data are used as data to be transmitted wirelessly. However, the present invention can be applied in a similar manner for any other type of data to be transmitted wirelessly.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-059559, filed Mar. 12, 2009, which is hereby incorporated by reference herein in its entirety.

The invention claimed is:

1. A wireless communication apparatus that conducts full-duplex wireless communication with a communication partner using a transmitting antenna and a receiving antenna, comprising:
    a transmitting unit configured to transmit a signal to a first communication path via the transmitting antenna using a first frequency channel;
    a receiving unit configured to receive a signal from a second communication path via the receiving antenna using a second frequency channel different from the first frequency channel;
    a control unit configured to control beam angle of directionality of at least one of the transmitting antenna and the receiving antenna such that the first and second communication paths are different from each other; and
    a determination unit configured to determine receiving status of the signal received by the receiving unit,
    wherein the transmitting unit is configured to transmit, to the communication partner, a signal for switching beam angle of directionality of a transmitting antenna of the communication partner, based on the determination of the determination unit, and
    wherein, when a communication interruption has occurred in one of the first communication path and the second communication path, the control unit controls the beam angle of directionality of at least one of the transmitting antenna and the receiving antenna so as to switch the direction of a communication path in which the communication interruption has occurred to the direction of a communication path in which the communication interruption has not occurred.

2. The apparatus according to claim 1, wherein the transmitting unit transmits an instruction for switching the communication path of the signal which the communication partner transmits, as the signal for switching the beam angle of directionality of the transmitting antenna of the communication partner.

3. The apparatus according to claim 1, wherein the beam angle of directionality of the receiving antenna is switched based on the determination of the determination unit.

4. The apparatus according to claim 1, wherein the determination unit determines whether the communication path of the signal from the communication partner is blocked.

5. The apparatus according to claim 1, wherein, when the receiving unit receives an instruction for switching the first communication path of a signal to be transmitted by the transmitting unit, the beam angle of directionality of the transmitting antenna is switched.

6. The apparatus according to claim 1, further comprising a wired interface for connecting to an external apparatus,
    wherein a signal received from the external apparatus via the wired interface is transmitted by the transmitting unit using the transmitting antenna, and
    wherein a signal received by the receiving unit using the receiving antenna is transmitted to the external apparatus via the wired interface.

7. A control method of a communication apparatus that conducts full-duplex wireless communication with a communication partner using a transmitting antenna and a receiving antenna, the method comprising:
    transmitting a signal to a first communication path via the transmitting antenna using a first frequency channel;
    receiving a signal from a second communication path via the receiving antenna using a second frequency channel different from the first frequency channel;

controlling beam angle of directionality of at least one of the transmitting antenna and the receiving antenna such that the first and second communication paths are different from each other;

determining receiving status of the signal received in the receiving step; and transmitting, to the communication partner, a signal for switching beam angle of directionality of a transmitting antenna of the communication partner, based on the determining of the receiving status, wherein, when a communication interruption has occurred in one of the first communication path and the second communication path, the beam angle of directionality of at least one of the transmitting antenna and the receiving antenna is controlled so as to switch the direction of a communication path in which the communication interruption has occurred to the direction of a communication path in which the communication interruption has not occurred.

8. A non-transitory computer-readable storage medium storing a program for causing a computer to execute a control method of a communication apparatus that conducts full-duplex wireless communication with a communication partner using a transmitting antenna and a receiving antenna, the method comprising:

transmitting a signal to a first communication path via the transmitting antenna using a first frequency channel;

receiving a signal from a second communication path via the receiving antenna using a second frequency channel different from the first frequency channel;

controlling beam angle of directionality of at least one of the transmitting antenna and the receiving antenna such that the first and second communication paths are different from each other;

determining receiving status of the signal received in the receiving step; and transmitting, to the communication partner, a signal for switching beam angle of directionality of a transmitting antenna of the communication partner, based on the determining of the receiving status, wherein, when a communication interruption has occurred in one of the first communication path and the second communication path, the beam angle of directionality of at least one of the transmitting antenna and the receiving antenna is controlled so as to switch the direction of a communication path in which the communication interruption has occurred to the direction of a communication path in which the communication interruption has not occurred.

9. The method according to claim 7, further comprising transmitting an instruction for switching the communication path of the signal which the communication partner transmits, as the signal for switching the beam angle of directionality of the transmitting antenna of the communication partner.

10. The method according to claim 7, further comprising switching the beam angle of directionality of the receiving antenna based on the determining of the receiving status.

11. The method according to claim 7, further comprising determining whether the communication path of the signal from the communication partner is blocked.

12. The method according to claim 7, further comprising switching the beam angle of directionality of the transmitting antenna when an instruction for switching the first communication path of a signal to be transmitted is received.

13. The non-transitory computer-readable storage medium according to claim 8, wherein the method further comprises switching the beam angle of directionality of the transmitting antenna when an instruction for switching the first communication path of a signal to be transmitted is received.

* * * * *